United States Patent
Matsuda et al.

(10) Patent No.: US 11,645,864 B2
(45) Date of Patent: May 9, 2023

(54) IMAGING DEVICE, AUTHENTICATION DEVICE, AND BIOMETRIC IMAGING METHOD

(71) Applicant: Hitachi, Ltd., Tokyo (JP)

(72) Inventors: Yusuke Matsuda, Tokyo (JP); Naoto Miura, Tokyo (JP); Akio Nagasaka, Tokyo (JP); Yo Nonomura, Tokyo (JP); Keiichiro Nakazaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/495,982

(22) Filed: Oct. 7, 2021

(65) Prior Publication Data
US 2022/0147731 A1    May 12, 2022

(30) Foreign Application Priority Data
Nov. 6, 2020   (JP) .............................. JP2020-185979

(51) Int. Cl.
| G06V 40/13 | (2022.01) |
| G06V 40/12 | (2022.01) |
| G06V 10/60 | (2022.01) |
| G06F 21/32 | (2013.01) |

(52) U.S. Cl.
CPC .......... *G06V 40/1318* (2022.01); *G06F 21/32* (2013.01); *G06V 10/60* (2022.01); *G06V 40/1365* (2022.01)

(58) Field of Classification Search
None
See application file for complete search history.

(56) References Cited

U.S. PATENT DOCUMENTS

| 10,117,623 B2 | 11/2018 | Shimano et al. |
| 2018/0292935 A1* | 10/2018 | Lin ........................ G06F 3/0412 |
| 2021/0089741 A1* | 3/2021 | Yeh ......................... G06F 3/044 |

FOREIGN PATENT DOCUMENTS

| JP | 2001-149348 A | 6/2001 |
| JP | 2006-148478 A | 6/2006 |
| JP | 2020-123068 A | 8/2020 |
| WO | WO-2018/135379 A1 | 7/2018 |

OTHER PUBLICATIONS

European Partial Search Report for Application No. 21201885.7 dated Apr. 8, 2022 (17 pages).
Extended European Search Report issued in corresponding European Application No. 21201885.7 dated Jul. 14, 2022 (13 pages).

* cited by examiner

*Primary Examiner* — Joseph R Haley
(74) *Attorney, Agent, or Firm* — Foley & Lardner LLP

(57) ABSTRACT

To provide an imaging device capable of reducing discomfort caused by visible light. A light source can emit the visible light and invisible light as irradiation light. An imaging unit captures an image of an irradiation region irradiated with the irradiation light to acquire an image. A processor causes the imaging unit to acquire a detection image in a first irradiation mode in which the invisible light is emitted from the light source, and determines whether a biometric object is presented in the irradiation region based on the detection image. When the biometric object is presented, the processor causes the imaging unit to acquire biometric image obtained by copying the biometric object as the image in a second irradiation mode in which the visible light and the invisible light are emitted from the light source.

9 Claims, 13 Drawing Sheets

IMAGING DEVICE, AUTHENTICATION DEVICE, AND BIOMETRIC IMAGING METHOD

BACKGROUND OF THE INVENTION

1. Field of the Invention

The present disclosure relates to an imaging device for capturing an image of a biometric object, an authentication device, and a biometric imaging method.

2. Description of the Related Art

Biometric authentication techniques using a biometric image obtained by capturing an image of a biometric object have attracted attention. Some biometric authentication techniques use, for example, a blood vessel image obtained by capturing an image of a blood vessel of a finger using a difference in absorption characteristics of near-infrared light between hemoglobin in the blood vessel and another biometric tissue.

JP-A-2020-123068 (Patent Literature 1) discloses a biometric authentication device that simultaneously irradiates a biometric object with a plurality of lights having different wavelength bands, such as infrared light and visible light, and performs biometric authentication using a biometric image captured using the light from the biometric object. In the biometric authentication device, the biometric image is separated into light component images corresponding to the plurality of lights emitted to the biometric object, and authentication is performed using the light component images, thereby improving authentication accuracy.

When a biometric image is captured using light including the visible light as in the technique described in Patent Literature 1, the visible light is emitted from a light source before the biometric object is presented in an irradiation region of the light source, and the visible light enters eyes of a person to be authenticated and people around the person, which may cause discomfort to people, for example, may cause glare.

SUMMARY OF THE INVENTION

An object of the present disclosure is to provide an imaging device, an authentication device, and a biometric imaging method capable of reducing discomfort caused by visible light.

An imaging device according to an aspect of the present disclosure includes: an irradiation unit capable of emitting visible light and invisible light as irradiation light; an imaging unit configured to capture an image of an irradiation region irradiated with the irradiation light to acquire an image; and a control unit that causes the imaging unit to acquire a detection image as the image in a first mode in which the irradiation unit emits the invisible light, determines whether a biometric object is presented in the irradiation region based on the detection image, and, when the biometric object is presented, causes the imaging unit to acquire a biometric image obtained by copying the biometric object as the image in a second mode in which the irradiation unit emits the visible light and the invisible light.

According to the invention, it is possible to reduce discomfort caused by visible light.

DESCRIPTION OF THE PREFERRED EMBODIMENTS

Hereinafter, embodiments of the present disclosure will be described with reference to the drawings.

First Embodiment

<Configuration Example of Authentication System>

Figure 1:
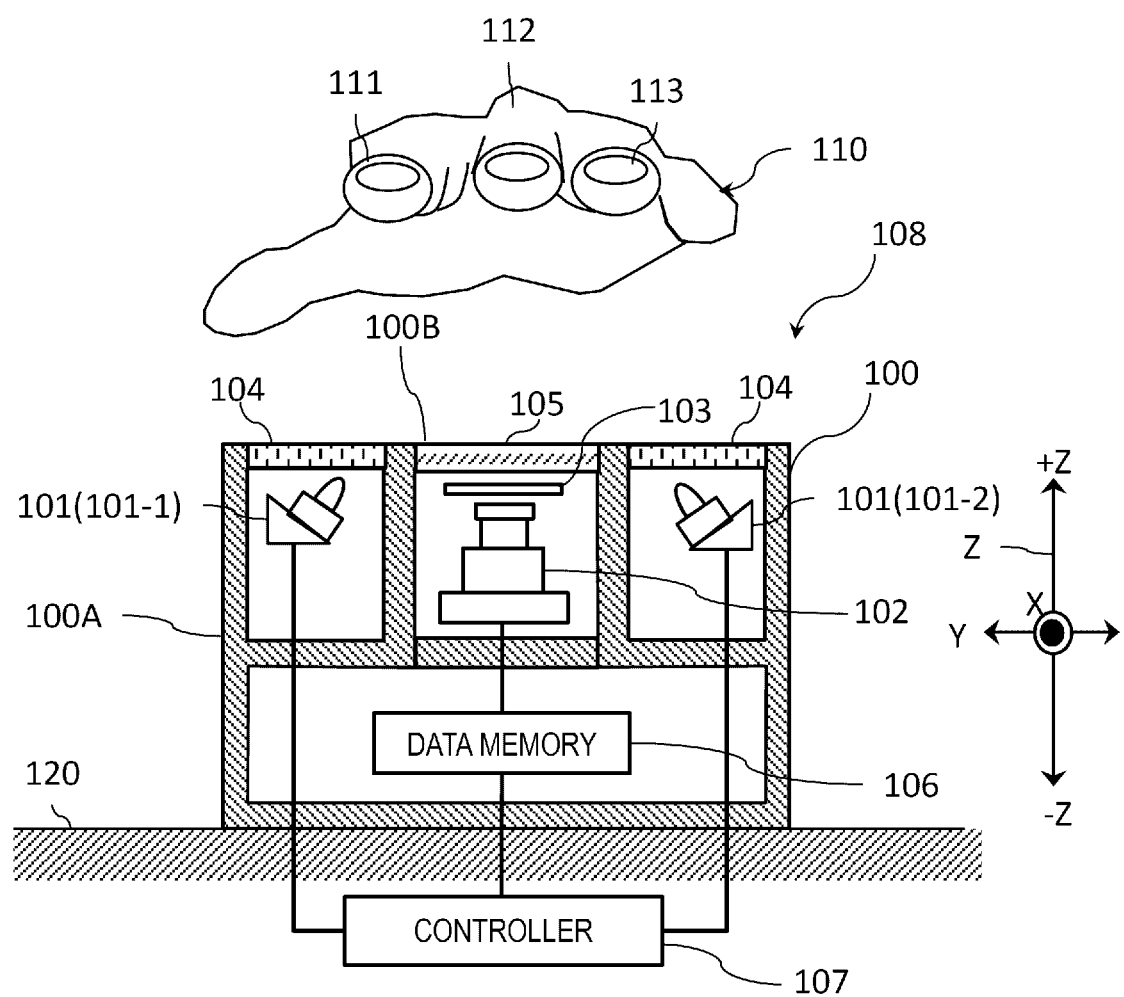
FIG. 1 is an illustrative diagram illustrating an example of an imaging device according to a first embodiment.

FIG. 1 is an illustrative diagram illustrating an imaging device according to a first embodiment of the disclosure. An imaging device 108 illustrated in FIG. 1 includes a main body unit 100 that captures an image of a biometric object and acquires biometric image data, and a controller 107 that is a control unit that controls the main body unit 100. The controller 107 may have an authentication function of performing biometric authentication based on the biometric image data acquired by the main body unit 100. When the controller 107 has the authentication function, the imaging device 108 may be referred to as an authentication device 108. Hereinafter, unless otherwise specified, it is assumed that the controller 107 has a function of an authentication unit. The main body unit 100 includes a housing 100A, a light source 101, an imaging unit 102, and a data memory 106.

In the present embodiment, the imaging device 108 captures an image of a finger of a hand 110 presented (specifically, held over) above an upper surface plate portion 100B of the housing 100A as a subject (biometric object). Here, fingers to be the subject are an index finger 111, a middle finger 112, and a ring finger 113, whereas the invention is not limited to this example. The number and the type of the fingers to be the subject are not particularly limited. For example, the fingers to be the subject may include two or more of the ten fingers of both hands. Hereinafter, the index finger 111, the middle finger 112, and the ring finger 113 may be simply referred to as fingers 111 to 113.

The housing 100A is installed (for example, attached or placed) on an installation surface 120. The installation surface 120 may be a horizontal surface such as a ground surface, a ceiling surface, or a desk surface, a vertical surface such as a wall surface, or a surface inclined obliquely. In the present embodiment, an axis orthogonal to the installation surface 120 is defined as a Z axis, a direction away from the installation surface 120 in the Z axis is defined as a +Z direction, and a direction close to the installation surface 120 is defined as a −Z direction. The installation surface 120 is parallel to an XY plane defined by the X axis and the Y axis. As illustrated in FIG. 1, the main body unit 100 is installed such that the fingers 111 to 113 of the hand 110 are presented above the upper surface plate portion 100B. The X axis is a longitudinal direction of the fingers when the fingers 111 to 113 are presented. The Y axis is an arrangement direction of the fingers 111 to 113.

The light source 101 is provided inside the housing 100A. The light source 101 is an irradiation unit that emits, as irradiation light, a plurality of wavelength lights having different wavelength bands toward the upper side (+Z direction) of the upper surface plate portion 100B of the housing 100A. Specifically, there are a plurality of light sources 101, and each of the light sources 101 emits wavelength lights having different wavelength bands. In the present embodiment, there are two light sources 101, which are referred to as light sources 101-1 and 101-2 when it is necessary to distinguish between the two light sources 101. The wavelength light includes visible light (for example, blue light or green light) and near-infrared light which is invisible light. In the present embodiment, the light source 101-1 emits the visible light, and the light source 101-2 emits the near-infrared light. The visible light is used to capture an image of the skin surface of the finger to acquire finger surface image data. The near-infrared light is used to capture an image of a blood vessel of the finger to acquire finger blood vessel image data. The light source 101 can emit the plurality of wavelength lights at the same time or at different timings.

The imaging unit 102 is provided inside the housing 100A. The imaging unit 102 includes, for example, an imaging element such as a complementary metal oxide semiconductor (CMOS) image sensor or a charge coupled device (CCD) image sensor. The imaging unit 102 is disposed such that an imaging surface of the imaging element faces the upper surface plate portion 100B of the housing 100A so as to capture an image of an irradiation region irradiated with the irradiation light from the light source 101. In a region of the upper surface plate portion 100B facing the imaging unit 102, a light transmitting plate 105 that transmits reflected light obtained by reflecting the irradiation light from the light source 101 by the fingers 111 to 113 is provided. The light transmitting plate 105 is made of, for example, a transparent material such as acrylic or glass. A film that allows only specific wavelength light to pass through may be attached to the light transmitting plate 105. Accordingly, it is difficult to visually recognize the inside of the main body unit 100 from the outside.

A first optical filter 103 is provided between the imaging unit 102 and the upper surface plate portion 100B of the housing 100A, and an optical path of the irradiation light from the light source 101 in the upper surface plate portion 100B is constituted by second optical filters 104.

The first optical filter 103 and the second optical filters 104 are band filters that transmit light of the same wavelength band as the irradiation light from the light source 101. In this case, it is possible to prevent the imaging unit 102 from receiving unnecessary light, and to prevent the generation of noise in the biometric image data. The first optical filter 103 and the second optical filters 104 may be deflection filters. In this case, among the irradiation light reflected by the fingers 111 to 113, a specular reflection component specularly reflected on the skin surface can be reduced, and clearer finger blood vessel image data can be acquired.

With the above configuration, the irradiation light from the light source 101 is reflected by the fingers 111 to 113 of the hand 110 presented above the upper surface plate portion 100B of the housing 100A via the second optical filter, and the reflected light is received by an imaging surface of the imaging unit 102 via the light transmitting plate 105 of the upper surface plate portion 100B and the first optical filter 103. Then, the light received by the imaging unit 102 is photoelectrically converted and output as image data. The imaging unit 102 is connected to the data memory 106, and the photoelectrically converted image data is stored in the data memory 106.

The image data includes the finger blood vessel image data indicating the blood vessel of the finger and the finger surface image data indicating a color of the skin surface based on unevenness of the skin surface such as a fingerprint or a difference in light absorption characteristics of skin tissue such as melanin and keratin. The finger blood vessel image data and the finger surface image data may be collectively referred to as finger image data.

The controller 107 is connected to the light source 101 and the data memory 106. In the example in FIG. 1, the controller 107 is provided outside the housing 100A.

The controller 107 has a function as a control unit that controls the light source 101 and the imaging unit 102 to cause the main body unit 100 to acquire the finger image data, and a function as an authentication unit that extracts feature data indicating features such as blood vessels and fingerprints of the fingers 111 to 113 from the finger image data and performs biometric authentication of a person to be authenticated based on the feature data.

Figure 2:
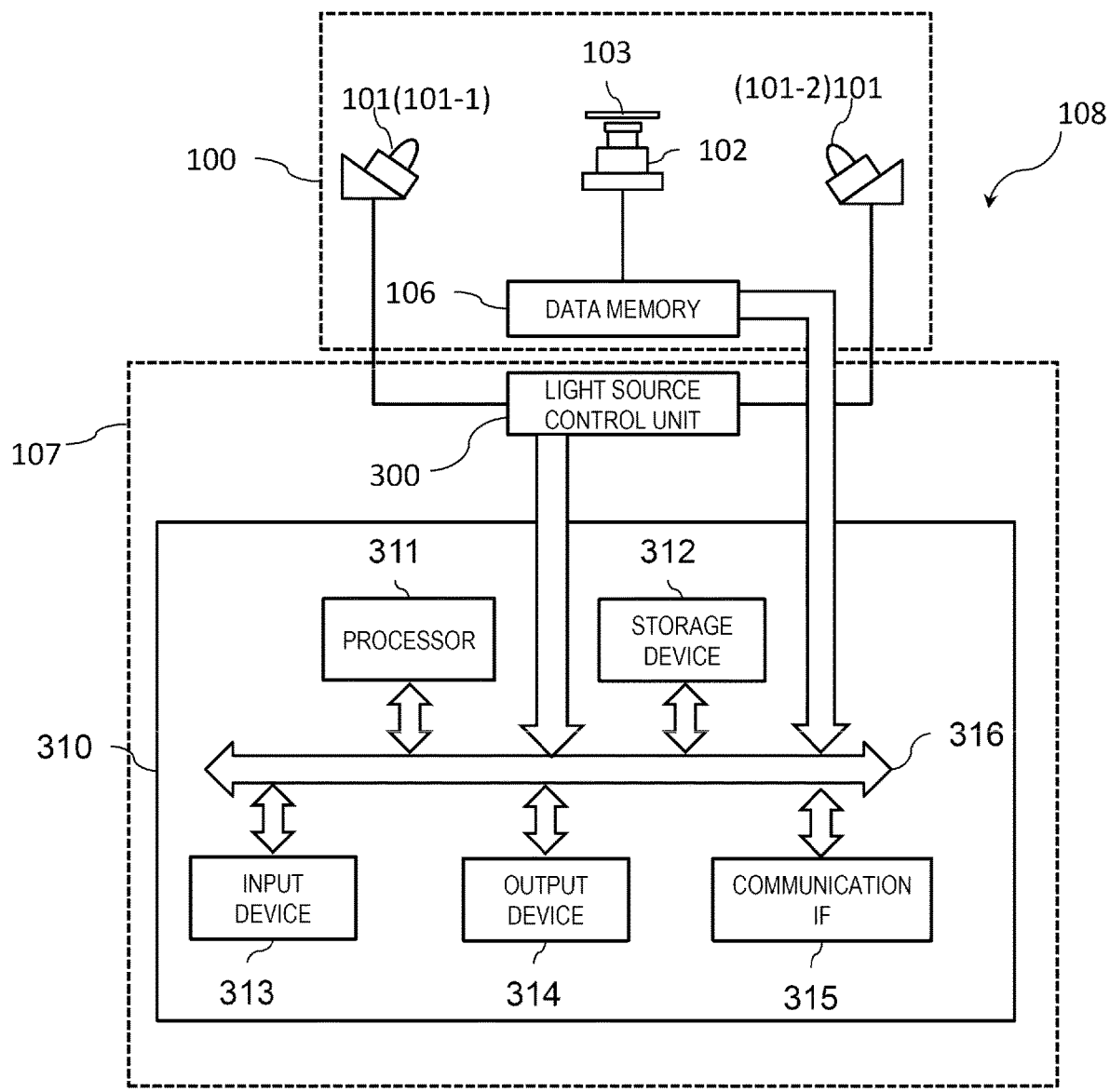
FIG. 2 is a block diagram illustrating a configuration example of the imaging device according to the first embodiment.

FIG. 2 is a block diagram illustrating a more detailed configuration example of the imaging device 108 illustrated in FIG. 1. As illustrated in FIG. 2, the imaging device 108 includes the main body unit 100 and the controller 107 as illustrated in FIG. 1. The controller 107 includes a light source control unit 300 and a computer 310.

The light source control unit 300 controls a lighting timing of the light source 101, a light amount of the irradiation light, and the like in accordance with an instruction from the computer 310.

The computer 310 includes a processor 311, a storage device 312, an input device 313, an output device 314, and a communication interface (IF) 315. The processor 311, the storage device 312, the input device 313, the output device 314, and the communication IF 315 are connected to each other via a bus 316.

The processor 311 reads a program stored in the storage device 312 and executes the read program to control the main body unit 100 and the entire controller 107. The storage device 312 is a non-transitory recording medium that stores various programs that define an operation of the processor 311 and data used by the processor 311. The storage device 312 is also used as a work area of the processor 311. The storage device 312 is, for example, a read only memory (ROM), a random access memory (RAM), a hard disk drive (HDD), or a flash memory.

The programs include, for example, an image processing program, a light source control program, and an authentication program. The image processing program is a program for performing image processing on image data generated by the imaging unit 102. The light source control program is a program for controlling the light source 101. The authentication program is a program for authenticating the person to be authenticated based on the image data. At least a part of functions implemented by the programs may be implemented by a dedicated circuit or the like.

The input device 313 receives various kinds of data from an administrator of the imaging device 108 or the like. The input device 313 is, for example, a keyboard, a mouse, a touch panel, a numeric keypad, or a scanner. The output device 314 outputs the data. The output device 314 is, for example, a display, a printer, or a speaker. The communication IF 315 is connected to an external device (not illustrated), and transmits and receives the data to and from the external device. When the controller 107 does not have the function as the authentication unit, authentication of the person to be authenticated may be performed by the external device connected to the communication IF 315. The communication IF 315 may be connected to the external device via a communication network such as the Internet.

Figure 3:
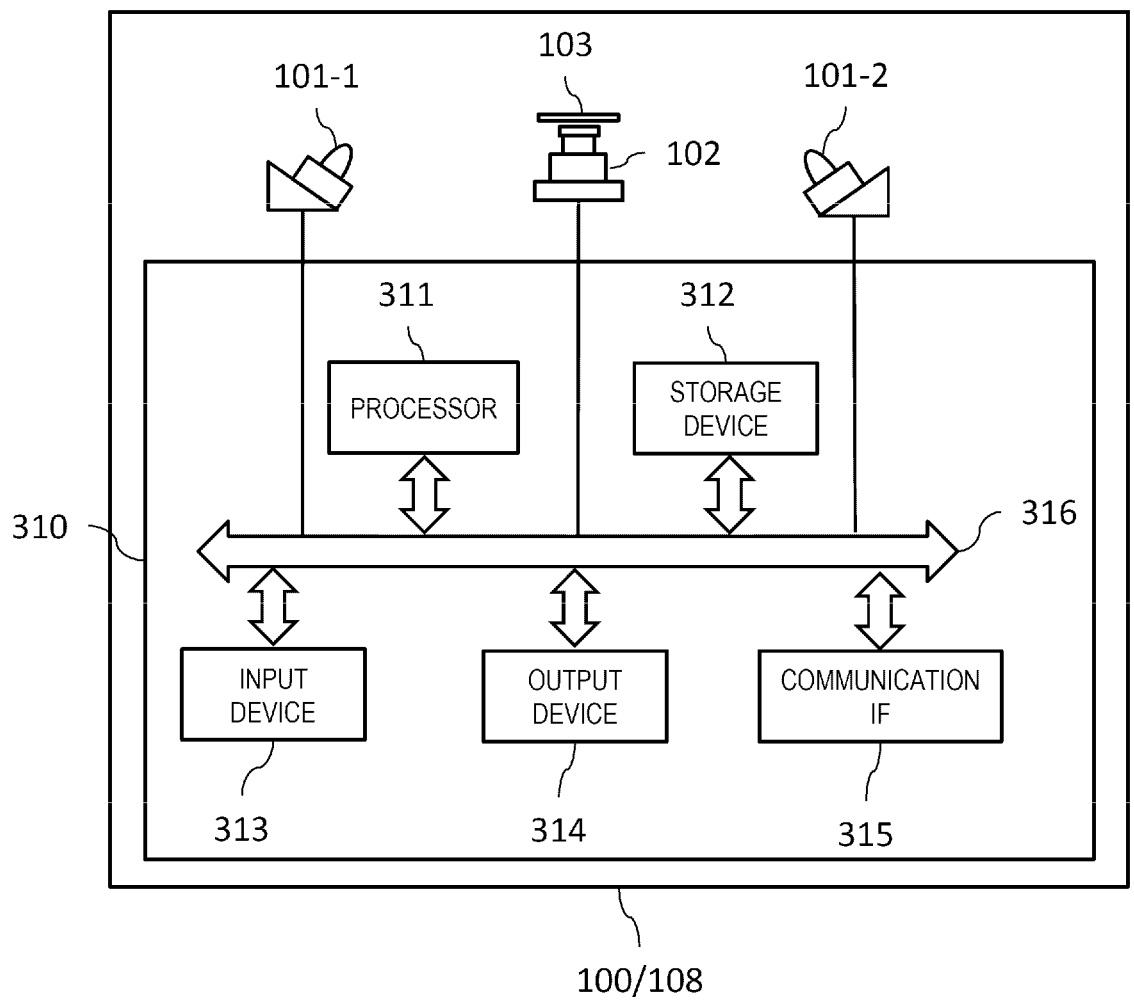
FIG. 3 is a block diagram illustrating another configuration example of the imaging device according to the first embodiment.

FIG. 3 is another configuration example of the imaging device 108. The imaging device 108 illustrated in FIG. 3 includes the computer 310 illustrated in FIG. 2 in the main body unit 100, and the computer 310 controls the light source 101 without using the light source control unit 300 illustrated in FIG. 2.

Figure 4:
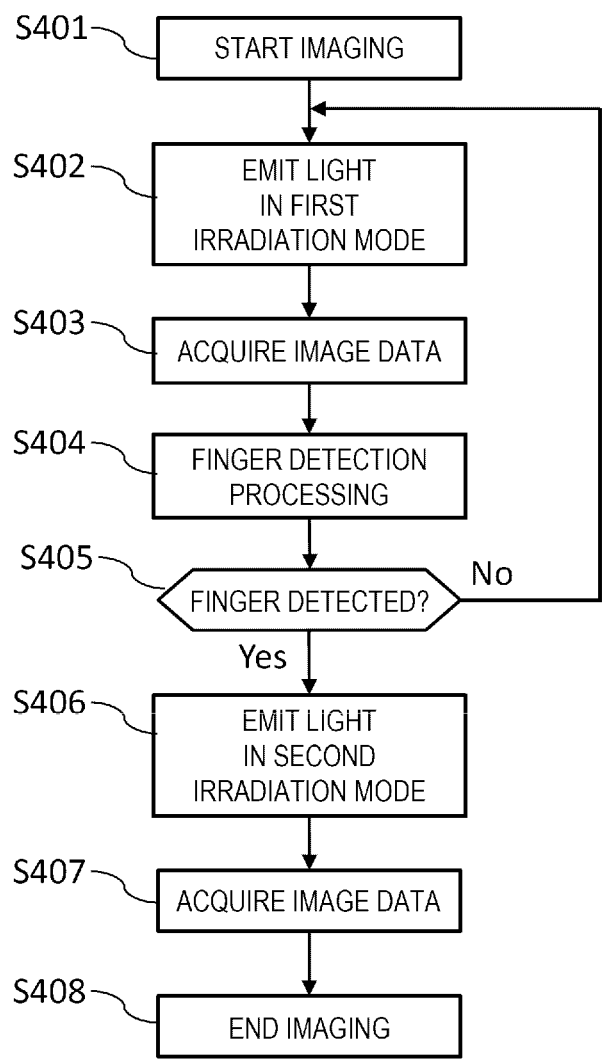
FIG. 4 is a flowchart illustrating an example of imaging correspondence processing of the imaging device according to the first embodiment.

FIG. 4 is a flowchart illustrating an example of imaging correspondence processing of acquiring biometric image data (finger image data) by the imaging device 108.

First, at a start timing for starting imaging (step S401), the processor 311 controls the light source control unit 300 to cause the light source 101 to emit light in a first irradiation mode (step S402). The start timing is, for example, a timing at which the person to be authenticated gives an instruction to start imaging or authentication, or a timing at which the person to be authenticated approaches the imaging device 108.

The first irradiation mode is a mode for acquiring detection image data in order to detect the fingers 111 to 113, and is a mode in which the near-infrared light is emitted from the light source 101. In the first irradiation mode, the near-infrared light is emitted with a light amount with which the fingers 111 to 113 presented in a non-contact state away from the main body unit 100 can be detected. The visible light may not be emitted at all. In order to notify the person to be authenticated that the authentication device 108 is in an authentication state in which the authentication is performed, it is preferable that the visible light is emitted with a small light amount to an extent that the person to be authenticated and people around the person to be authenticated hardly feel glare even if the visible light is emitted to the eyes. The light amount of the visible light is determined such that, for example, the light amount of visible light is smaller than the light amount of near-infrared light, and a difference or a ratio between the light amount of visible light and the light amount of near-infrared light is constant.

The light amount of the near-infrared light and the visible light may be constant. Alternatively, the light amount of the near-infrared light may be changed in accordance with brightness of environment (the light amount of environmental light) at the time of imaging. For example, the processor 311 increases the light amount of the near-infrared light when the light amount of the near-infrared light of sunlight is large in the environmental light such as daytime. Accordingly, it is possible to improve detection accuracy of detecting the fingers 111 to 113. The amount of environmental light may be determined, for example, by periodically acquiring image data captured in a state where the finger is not presented and determining the amount of environmental light based on the image data, or by providing a sensor that detects the amount of environmental light and acquiring the amount of environmental light from the sensor. The amount of visible light may also be varied. For example, the amount of visible light may be increased or decreased with passage of time. In this case, it is possible to cause the person to be authenticated to more accurately recognize that the person to be authenticated is in the authentication state.

Subsequently, the processor 311 drives the imaging unit 102. The imaging unit 102 performs imaging to generate the image data, and stores the image data in the data memory 106 (step S403). Then, the processor 311 analyzes the image data stored in the data memory 106, and executes finger detection processing for detecting a finger region in which the fingers 111 to 113 are copied in the image data (step S404).

Specifically, the finger detection processing is binarization processing of generating binary image data in which the finger region, which is a foreground region in which the fingers 111 to 113 are copied, and a background region other than the finger region are distinguished from each other in the image data. Here, it is assumed that the light amount of the near-infrared light included in the environmental light is sufficiently smaller than the light amount of the near-infrared light included in the irradiation light from the light source 101, and the processor 311 regards a bright region in the image data as the finger region and a dark region as the background region. The bright region is, for example, a region of pixels having a luminance value equal to or greater than a threshold. The dark region is a region of pixels having a luminance value less than the threshold. In the present embodiment, when the visible light is also emitted in the first irradiation mode, the processor 311 separates the image data into the finger blood vessel image data which is near-infrared light image data and the finger surface image data which is visible light image data, and generates the binary image data from the near-infrared light image data.

Then, the processor 311 determines whether the finger is detected based on the binary image data which is a processing result of the finger detection processing, thereby determining whether the finger is presented at an appropriate position of the irradiation region of the light source 101 (step S405). For example, the processor 311 determines whether a ratio of the finger region to the entire region in the image data exceeds a predetermined ratio, and determines that the finger is detected when the ratio of the finger region exceeds the predetermined ratio. The processor 311 may determine whether a shape of a contour line, which is a boundary line between the finger region and the background region in the binary image data, indicates the shape of the finger, and may determine that the finger is detected when the shape of the contour line of the finger region indicates the shape of the finger. The expression "the shape of the contour line of the finger region indicates the shape of the finger" means that, for example, a degree of similarity between the shape of the contour line of the finger region and the shape of the finger registered in advance indicates a predetermined value or more. The shape of the finger may be the shape of the entire finger, or may be the shape of a part of the finger such as a fingertip and a base of the finger.

When the finger is not detected (step S405: No), the processor 311 returns the processing to the processing in step S402. On the other hand, when the finger is detected (step S405: Yes), the processor 311 controls the light source control unit 300 to cause the light source 101 to emit light in a second irradiation mode (step S406).

The second irradiation mode is a mode for acquiring the biometric image data (finger image data) for authenticating the person to be authenticated, and is a mode in which both the near-infrared light and the visible light are emitted from the light source 101. In the second irradiation mode, the amount of visible light is larger than the amount of visible light when the visible light is emitted in the first irradiation mode. The light amounts of the infrared light and the visible light are set such that the finger image data has appropriate brightness in a state where the fingers 111 to 113 are simultaneously emitted with the near-infrared light and the visible light. At this time, the light amounts of the infrared light and the visible light are set separately. For example, when the imaging unit 102 includes a plurality of sensors having different wavelength sensitivity characteristics such as a camera, the imaging unit 102 can generate the near-infrared light image data corresponding to the image data acquired by emitting only the near-infrared light and the visible light image data corresponding to the image data acquired by emitting only the visible light by using a difference in the wavelength sensitivity characteristics of sensors with respect to color image data acquired in a state where the plurality of wavelength lights (near-infrared light and visible light) are simultaneously emitted from the light source. In this case, the light amount of the near-infrared light is adjusted such that the brightness (for example, an average luminance value) of the finger region of the near-infrared light image data is included in an appropriate range, and the light amount of the visible light is adjusted such that the brightness of the finger region of the visible light image data is included in an appropriate range. In the present embodiment, it is assumed that the light amount of the near-infrared light and the visible light are adjusted in advance.

Then, the processor 311 drives the imaging unit 102. The imaging unit 102 performs the imaging to generate image data and stores the image data in the data memory 106 as the finger image data (step S407). Accordingly, the imaging correspondence processing ends (step S408).

Figure 5:
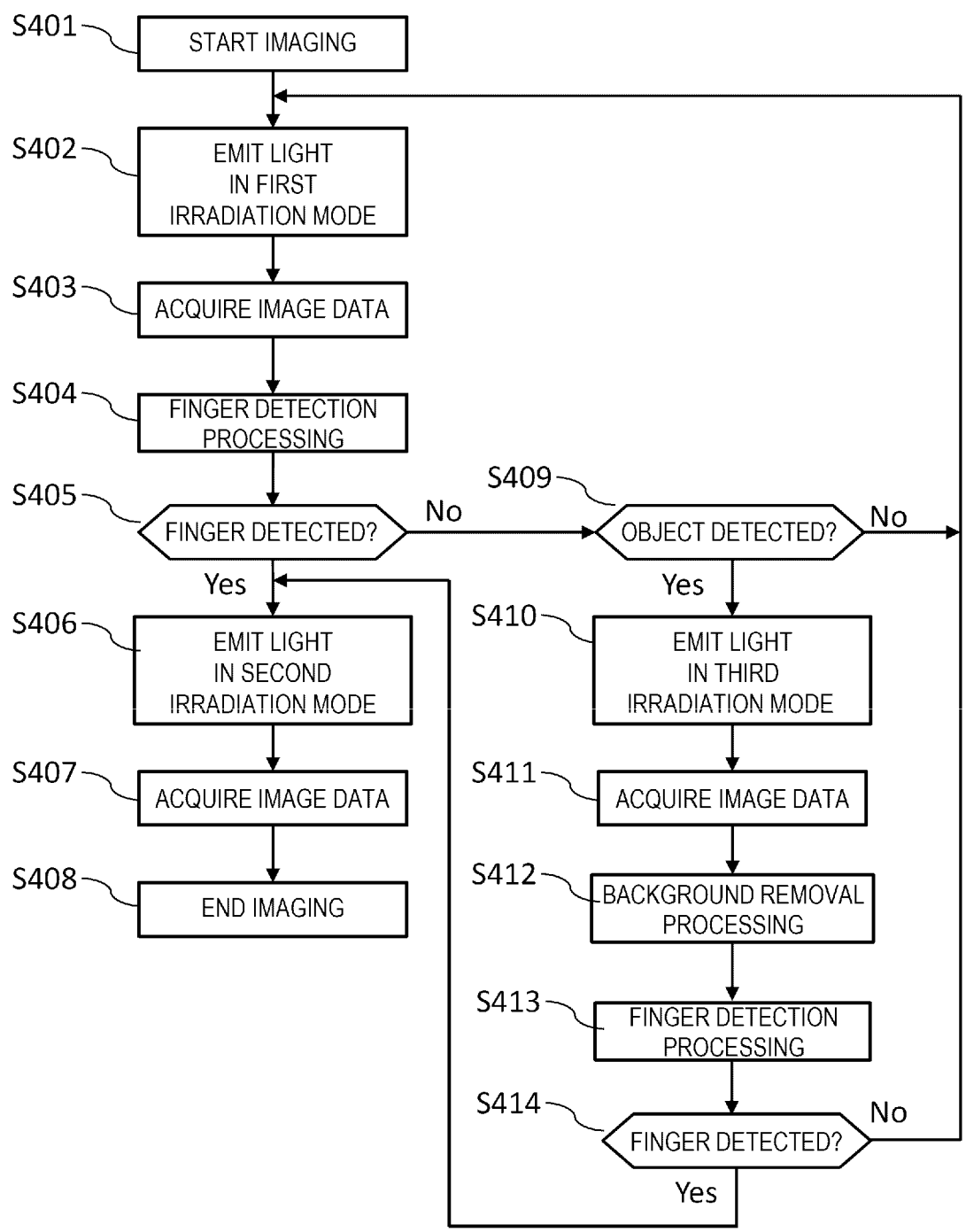
FIG. 5 is a flowchart illustrating another example of the imaging correspondence processing of the imaging device according to the first embodiment.

FIG. 5 is a flowchart illustrating another example of the imaging correspondence processing performed by the imaging device 108. The example in FIG. 5 is an example in which processing for a case where an object other than the finger is detected in the binary image data due to the influence of noise such as the environmental light and the finger region and the background region cannot be accurately distinguished is added in step S405 in FIG. 4. Specifically, the processing in steps S409 to S414 is added to the imaging correspondence processing in FIG. 4.

When the finger is not detected at step S405 (step S405: No), the processor 311 determines whether the object other than the finger is detected in the binary image data (step S409). Here, the object being detected means that there is a region other than the finger region included in the foreground region. For example, the processor 311 determines whether the ratio of the foreground region to the entire region in the image data exceeds a specified value, and determines that the object is detected when the ratio of the foreground region exceeds the specified value. In step S405, it is assumed that whether the finger is detected is determined by whether the contour line of the finger region indicates the shape of the finger.

When the object is not detected (step S409: No), the processor 311 returns the processing to the processing in step S402. On the other hand, when the object is detected (step S409: Yes), the processor 311 controls the light source control unit 300 to cause the light source 101 to emit light in a third irradiation mode (step S410).

The third irradiation mode is a mode for detecting the finger when the object is detected, and is a mode in which both the near-infrared light and the visible light are emitted from the light source 101. In the third irradiation mode, the amount of visible light is larger than the amount of visible light when the visible light is emitted in the first irradiation mode. The light amount of the near-infrared light and the visible light may be, for example, values set in advance, or may be calculated by the processor 311 based on the light amount of the near-infrared light emitted by the light source 101 in step S402 and the brightness of the finger image data acquired in step S403.

The processor 311 is driven by the imaging unit 102. The imaging unit 102 performs the imaging to generate image data and stores the image data in the data memory 106 as the finger image data (step S411). Then, the processor 311 performs background removal processing for removing the background from the finger image data stored in the data memory 106 (step S412). Here, the image data is image data based on the plurality of wavelength lights (near-infrared light and visible light). In this case, it is possible to increase accuracy of the background removal processing compared to image data based on single wavelength light, and it is possible to accurately remove the object as the background.

Then, the processor 311 analyzes the image data from which the background is removed by the background removal processing, and executes the finger detection processing for detecting the finger region in which the fingers 111 to 113 are copied in the image data (step S413). The processor 311 determines whether the finger is detected based on the binary image data that is the processing result of the finger detection processing (step S414). Here, it is assumed that whether the finger is detected is determined by whether the finger region represents the shape of the finger. When the finger is not detected (step S414: No), the processor 311 returns the processing to the processing in step S402. When the finger is detected (step S414: Yes), the processor 311 moves the processing to the processing in step S406.

When the object other than the finger is detected, the finger may be detected using other devices such as a distance measurement sensor (not illustrated).

Figure 6:
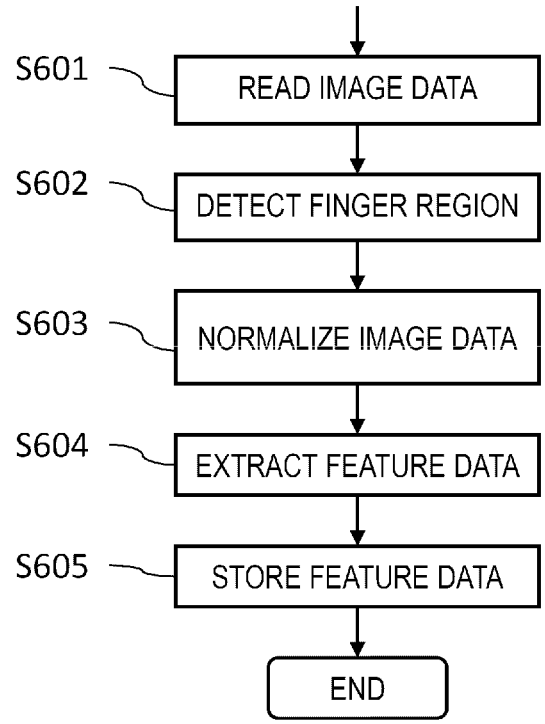
FIG. 6 is a diagram illustrating an example of registration processing of the imaging device according to the first embodiment.

FIG. 6 is a flowchart illustrating an example of registration processing that is processing performed after the imaging correspondence processing performed by the imaging device 108.

In the registration processing, after the imaging correspondence processing ends (step S408), the processor 311 reads the finger image data stored in the data memory 106 (step S601). The processor 311 detects a finger region from the read finger image data by image processing (step S602), and performs normalization processing for normalizing the finger image data based on the finger region (step S603). The normalization processing is processing of correcting an enlargement ratio, distortion, and the like of the finger region according to a position and a posture of the finger based on the finger region.

The processor 311 extracts feature data indicating a feature of the finger from the normalized finger image data (step S604), stores the feature data in the data memory 106 or the storage device 312 as registered feature data (step S605, and ends the processing. In the present embodiment, the feature data are features of the blood vessels of the finger (blood vessel pattern and the like) and features of the surface of the finger (fingerprint and the like). The processor 311 separates the finger image data into the finger blood vessel image data which is the near-infrared light image data and the finger surface image data which is the visible light image data, and extracts the feature data from each of the finger blood vessel image data and the finger surface image data. The feature data is extracted for each of the fingers 111 to 113.

The processor 311 may store the registered feature data in association with person to be authenticated information related to the person to be authenticated, such as a user ID and a personal identification number. At this time, the processor 311 may receive the user ID and the personal identification number from the person to be authenticated via the input device 313, or may acquire the person to be authenticated information from an IC chip or a communication terminal possessed by the person to be authenticated via the communication IF 315. The processor 311 may store the finger image data in the data memory 106 or the storage device 312 without extracting the feature data in step S604.

Figure 7:
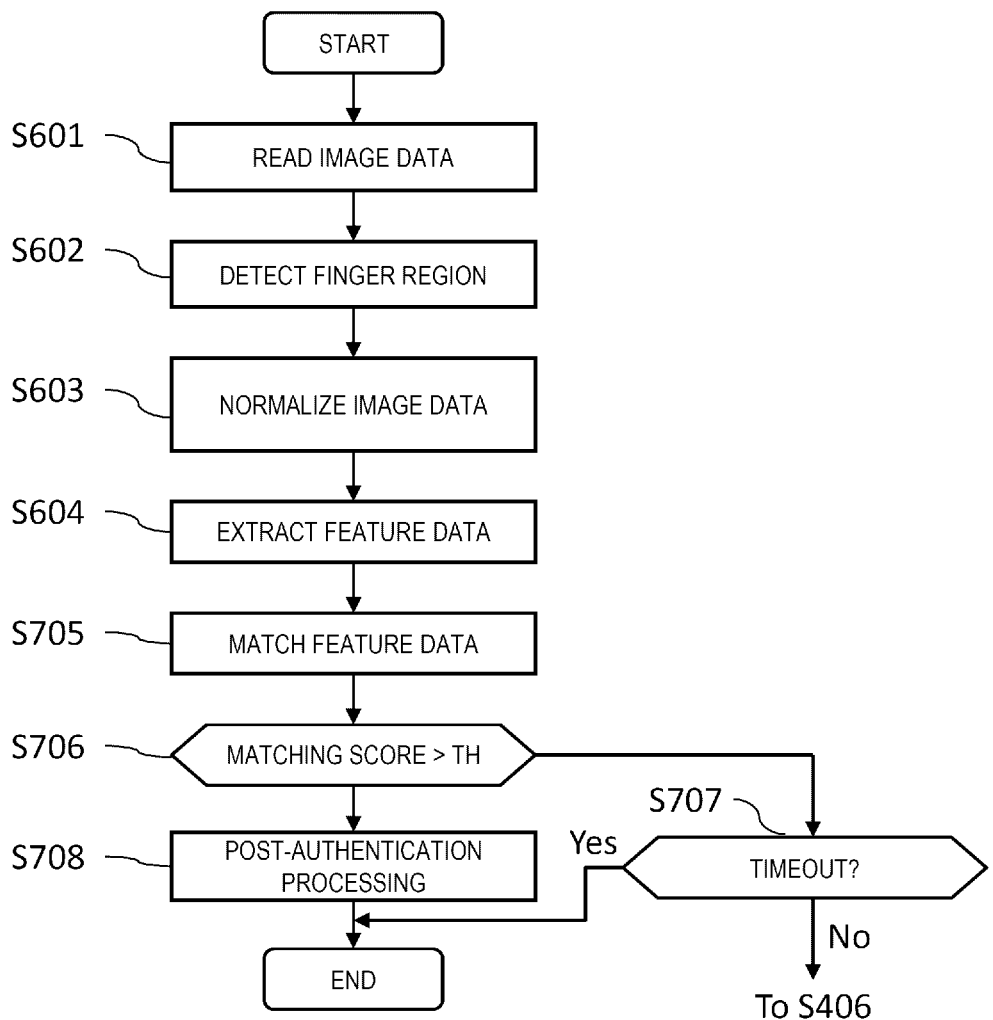
FIG. 7 is a diagram illustrating an example of authentication processing of the imaging device according to the first embodiment.

FIG. 7 is a flowchart illustrating an example of the authentication processing which is processing performed after the imaging correspondence processing performed by the imaging device 108. Either the authentication processing or the registration processing in FIG. 6 is performed.

In the authentication processing, first, the processing of steps S601 to S604 are executed. Thereafter, the processor 311 executes matching processing of matching the feature data extracted in step S604 with the registered feature data registered in the data memory 106 or the storage device 312 in the registration processing (step S705).

The matching processing may be one-to-one authentication processing in which registered feature data to be matched with the feature data is matched with registered feature data corresponding to the same person to be authenticated information as the person to be authenticated information acquired via the input device 313 or the communication IF 315, or may be one-to-N authentication processing in which the feature data is set as each registered feature data registered in the data memory 106 or the storage device 312. In the present embodiment, the feature data of the index finger 111, the middle finger 112, and the ring finger 113 are matched separately.

The processor 311 determines whether the authentication of the person to be authenticated is successful based on a processing result of the matching processing (step S706). Here, the processor 311 determines identity between the feature data and the registered feature data, and calculates a matching score based on a determination result. The identity is that a numerical value indicating a difference between a feature (a pattern of a blood vessel of each finger, a fingerprint, or the like) indicated by the feature data and a feature indicated by the registered feature data is included in a predetermined allowable range. The processor 311 determines the identity for each feature, and increases the matching score as the number of features satisfying the identity increases. Then, the processor 311 determines whether the matching score is larger than a threshold TH, and determines whether the authentication of the person to be authenticated is successful.

When the matching score is equal to or less than the threshold TH (step S706: No), the processor 311 determines that the biometric authentication of the person to be authenticated fails, and determines whether a timeout period has elapsed since the start of step S401 in FIG. 4 (step S707). When the timeout period has not elapsed (step S707: No), the processor 311 returns the processing to the processing in step S406 in FIG. 4 or FIG. 5. When the timeout period has elapsed (step S707: Yes), the processor 311 ends the authentication processing.

On the other hand, when the matching score is greater than the threshold TH (step S706: Yes), the processor 311 determines that the biometric authentication of the person to be authenticated is successful, executes predetermined post-authentication processing (step S708), and ends the authentication processing.

As described above, according to the present embodiment, the light source 101 can emit the visible light and the invisible light as the irradiation light. The imaging unit 102 captures the image of the irradiation region emitted with the irradiation light to acquire the image data. The processor 311 causes the imaging unit 102 to acquire the detection image data in the first irradiation mode in which the invisible light is emitted from the light source 101, and determines whether a biometric object is presented in the irradiation region based on the detection image data. When the biometric object is presented, the processor 311 causes the imaging unit 102 to acquire the biometric image data obtained by copying the biometric object as the image data in the second irradiation mode in which the visible light and the invisible light are emitted from the light source 101. Therefore, since it is not necessary to emit the visible light for acquiring the biometric image data before the biometric object is presented, it is possible to reduce the possibility that light emitted from the light source enters the eyes of the person to be authenticated and people around the person to be authenticated before the biometric object is presented in front of the light source 101 and causes the person to feel glare. Therefore, it is possible to reduce discomfort caused by the visible light.

In addition, in the present embodiment, in the first mode, the visible light is further emitted from the light source with a light amount smaller than the light amount of the invisible light. Therefore, it is possible to notify the person to be authenticated that the authentication device 108 is in the authentication state of performing the authentication while reducing the discomfort caused by the visible light.

Second Embodiment

The second embodiment is a modification of the first embodiment, and is an example in which authentication accuracy is improved by detecting a shadow region included in image data. Hereinafter, configurations and operations different from those of the first embodiment will be mainly described.

Figure 8:
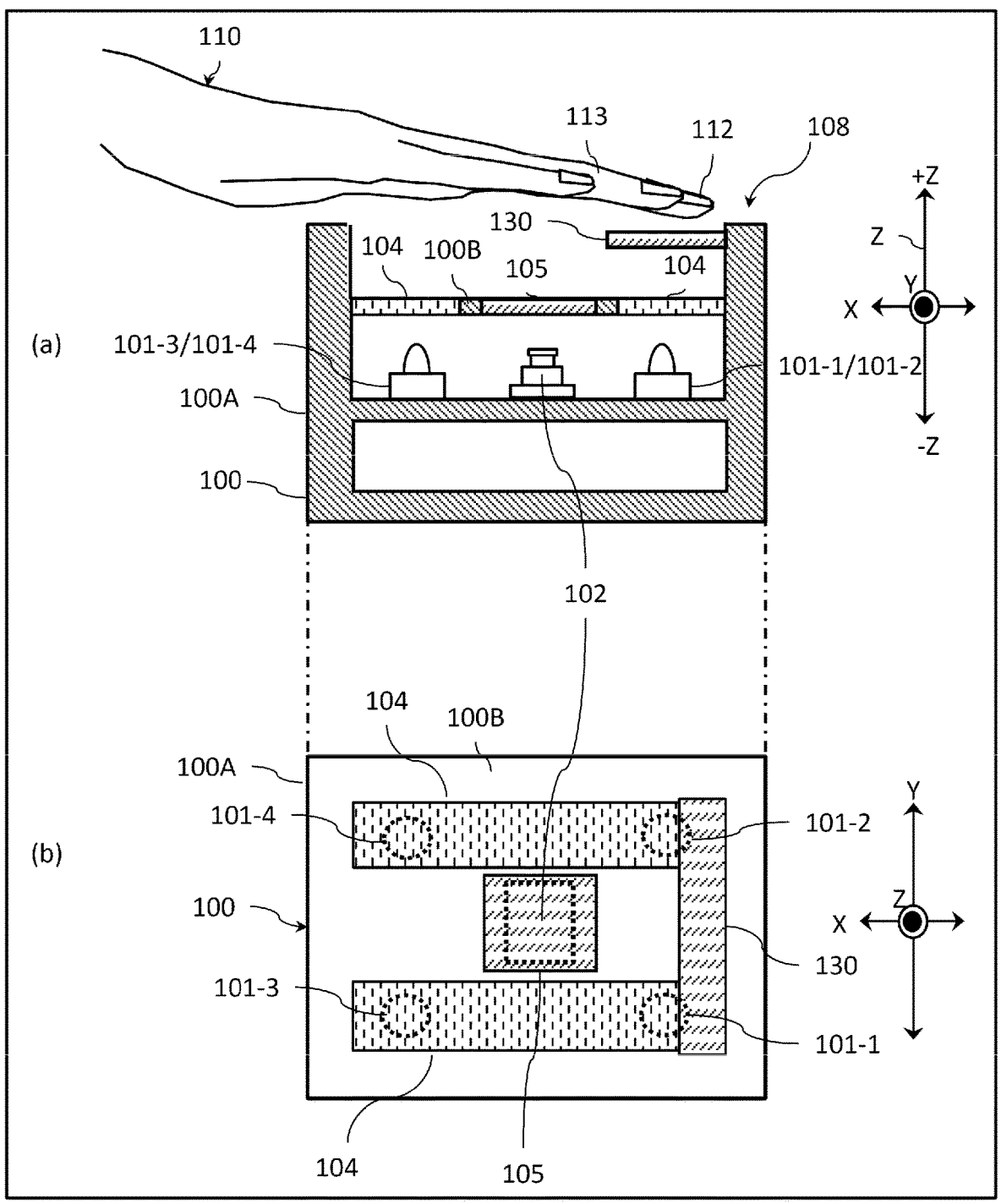
FIG. 8 is an illustrative diagram illustrating a configuration example of an imaging device according to a second embodiment.

FIG. 8 is a diagram illustrating a configuration example of the main body unit 100 according to the present embodiment. FIG. 8A is a side cross-sectional view of the main body unit 100. FIG. 8B is a plan view of the main body unit 100.

In the example in FIG. 8, there are four light sources 101, which are referred to as light sources 101-1 to 101-4 when it is necessary to distinguish one from another. The light sources 101-1 and 101-3 are light sources corresponding to the index finger 111, and are arranged side by side in an X direction. For example, the light source 101-1 is provided at a position corresponding to a fingertip of the index finger 111. The light source 101-3 is provided at a position corresponding to a base of the index finger 111. The light sources 101-2 and 101-4 are light sources corresponding to the ring finger 113, and are arranged side by side in the X direction. For example, the light source 101-2 is provided at a position corresponding to the fingertip of the ring finger 113. The light source 101-4 is provided at a position corresponding to the base of the ring finger 113. The light sources 101-1 and 101-2 and the light sources 101-3 and 101-4 are arranged side by side in a Y direction. The imaging unit 102 is provided at a position surrounded by the light sources 101-1 to 101-4 in an XY plane. Each light source 101 may include a plurality of light sources that emit near-infrared light and visible light, respectively.

A fingertip presenting plate 130 for guiding the fingertip of the hand 110 presented by a user to an appropriate position is provided at a position in a +Z direction from the second optical filters 104 corresponding to the light sources 101-1 and 101-3. The fingertip presenting plate 130 is formed of a transparent plate-shaped member such as acrylic or glass. In the example in FIG. 8, the fingertip presenting plate 130 is supported by the housing 100A in a state of being parallel to the XY plane. Accordingly, the entire finger can be captured by the imaging unit 102 in a state where a person to be authenticated places the finger on the fingertip presenting plate 130 or holds the finger over the fingertip presenting plate 130 in a non-contact manner.

However, in the example in FIG. 8, the fingertip presenting plate 130 has a protrusion structure that projects a shadow onto the fingers 111 to 113 presented in the irradiation region of the light source 101, and there is a concern that the shadow region due to the fingertip presenting plate 130 may be generated in finger image data. In this case, it is difficult to accurately detect the finger, and there is a concern that authentication accuracy may be reduced. Even if the finger is detected, the shadow region is included in feature data as noise information, which may cause the reduction in the authentication accuracy also from this viewpoint.

Figure 9:
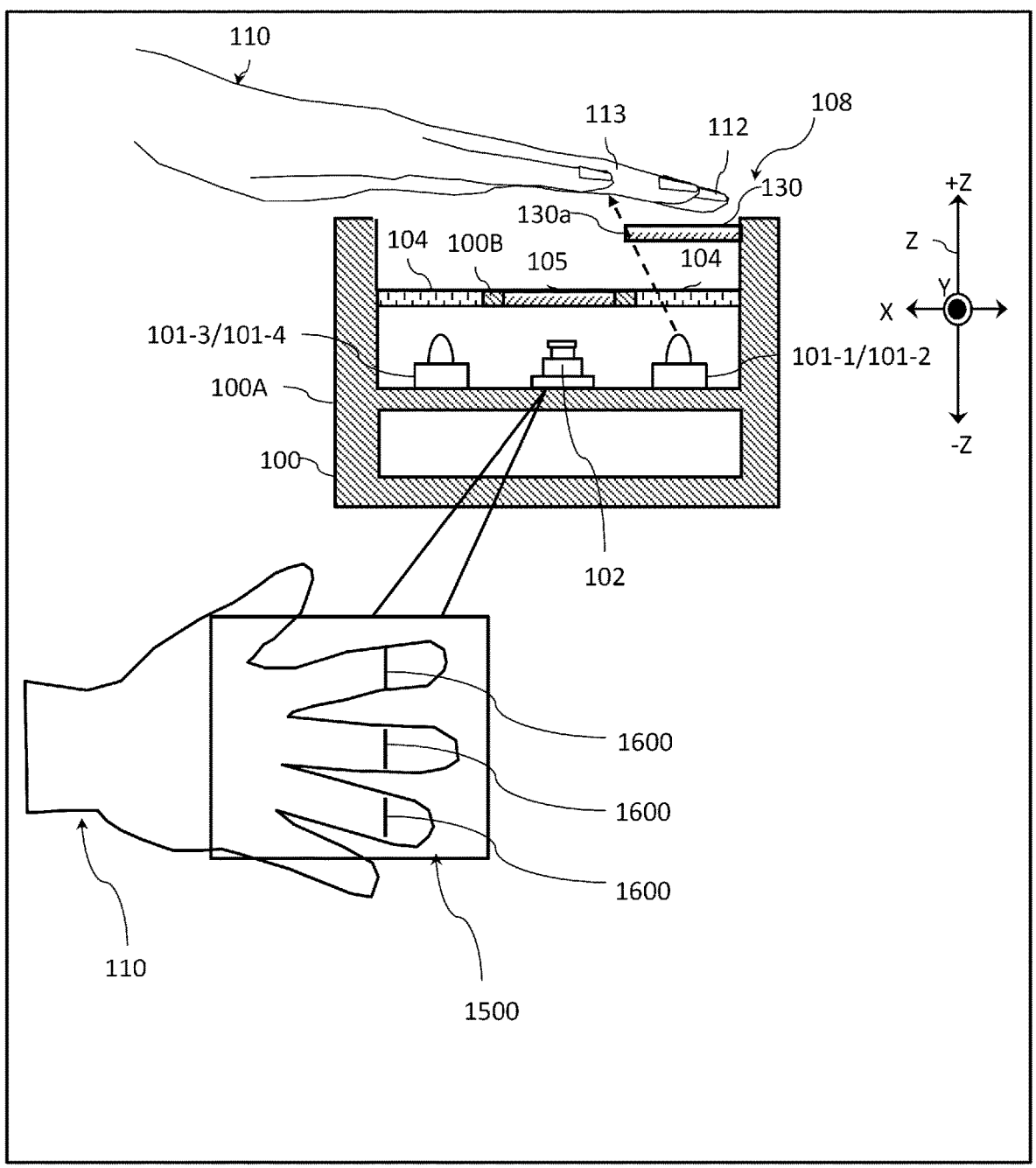
FIG. 9 is a diagram illustrating an example of a shadow region corresponding to a shadow projected on a biometric object.

FIG. 9 is a diagram illustrating an example of the shadow region. As illustrated in FIG. 9, most of the light emitted from the light sources 101-1 and 101-2 on a fingertip side is transmitted through the fingertip presenting plate 130, whereas in a region of an edge 130a on a base side of the finger in the fingertip presenting plate 130, a refractive index of the irradiation light is large, and thus a component of the irradiation light that is transmitted through the fingertip presenting plate 130 and travels straight is extremely small. As a result, in finger image data 1500, an edge of the fingertip presenting plate 130 is projected onto the finger region as a shadow region 1600.

When the shadow region is included in the finger image data as described above, the processor 311 performs shadow correspondence processing in accordance with the shadow region. Therefore, it is possible to prevent the reduction in the authentication accuracy or the like.

<Example of Removing Shadow Region from Biometric Region>

The processor 311 detects the shadow region 1600 by using a difference in luminance of the finger image data (finger blood vessel image data and finger surface image data) corresponding to the plurality of wavelength lights based on a difference in light absorption characteristics of the plurality of wavelength lights in a biometric object. Specifically, since the near-infrared light has a characteristic of being more easily transmitted through the biometric object than the visible light, the near-infrared light emitted to the biometric object is easily scattered and reflected in a shallow interior from a surface of the biometric object. Therefore, the near-infrared light is likely to propagate to the shadow region 1600. On the other hand, since the visible light is reflected by the surface of the biometric object, it is difficult for the visible light to propagate to the shadow region 1600. Therefore, the shadow region 1600 of the finger image data 1500 captured with near-infrared light is likely to be brighter than the shadow region 1600 of the finger image data 1500 captured with the visible light. Therefore, the processor 311 detects the shadow region 1600 by using the difference in luminance between the near-infrared light image data and the visible light image data, and excludes the shadow region 1600 from an extraction target region from which a feature data is extracted. Accordingly, high authentication accuracy can be maintained.

As a specific method of detecting shadow region 1600, for example, a method is conceivable in which the processor 311 detects, as the shadow region 1600, a region in the finger region corresponding to the vicinity of the edge 130a of the fingertip presenting plate 130 in which the luminance is lower than the luminance of the surrounding region and the luminance of the visible light image data is lower than the luminance of the near-infrared light image data.

For detection of the shadow region 1600, not only a simple difference in luminance but also a difference in luminance change in an image can be used. Since the near-infrared light is likely to propagate to the shadow region 1600 as described above, the luminance change at a boundary of the shadow region 1600 of the near-infrared light image data is gentle, and a boundary line thereof becomes ambiguous. On the other hand, since the visible light is less likely to propagate to the shadow region 1600, the luminance of the boundary of the shadow region 1600 of the visible light image data changes more rapidly than that of the near-infrared light image data. Therefore, for example, the processor 311 may detect, as the shadow region 1600, a region in which the luminance is lower than that of the surrounding region and the luminance change of the visible light image data is steeper than the luminance change of the near-infrared light image data. The processor 311 may detect the shadow region 1600 by using the difference in luminance difference and the difference in luminance change in combination.

The near-infrared light image data and the visible light image data may be acquired at different timings, or may be separated from the finger image data captured by simultaneously emitting the near-infrared light and the visible light. A method of separating the finger image data into the image data for each wavelength light is not particularly limited. For example, when the imaging unit 102 includes a plurality of sensors having different wavelength sensitivity characteristics, the imaging unit 102 acquires the finger image data by simultaneously emitting a plurality of different wavelength lights (near-infrared light and visible light) from the light source 101 and capturing the images of the fingers 111 to 113 with the reflected light from the fingers 111 to 113. The processor 311 can separate the finger image data by performing image processing on the finger image data using a difference in the wavelength sensitivity characteristics of respective sensors.

<Example of Detecting Posture of Finger Based on Shadow Region>

The processor 311 may detect at least one of position and posture of the finger based on the detected shadow region 1600. The position and the luminance of the shadow region 1600 change in accordance with a positional relationship between a shield and the light source 101 that generate the shadow region 1600 and the biometric object (fingers 111 to 113). For example, in the example in FIG. 9, when the hand moves in a Z direction, the position of the shadow region 1600 in the finger image data moves in an X-axis direction and a Y-axis direction. Therefore, when the position of the shadow region 1600 in the finger image data is deviated from a reference position by a predetermined distance (pixel) or more, the processor 311 can determine that the fingers 111 to 113 deviate from the appropriate position and notify the person to be authenticated of a fact via the output device 314 or the like. The reference position is a position of the shadow region 1600 generated when the finger is presented at the appropriate position, and, for example, is registered in advance in the storage device 312 or the like.

When the posture of the fingers 111 to 113 is not a horizontal posture as illustrated in FIG. 9 but a posture in which the fingertip is lowered or a posture in which the finger is bent, the shadow region 1600 is distorted compared to a case where the posture of the fingers 111 to 113 is the horizontal posture. Therefore, the processor 311 may determine whether the fingers 111 to 113 deviate from the appropriate posture by determining whether the distortion of the shadow region 1600 deviates from an appropriate range.

Figure 10:
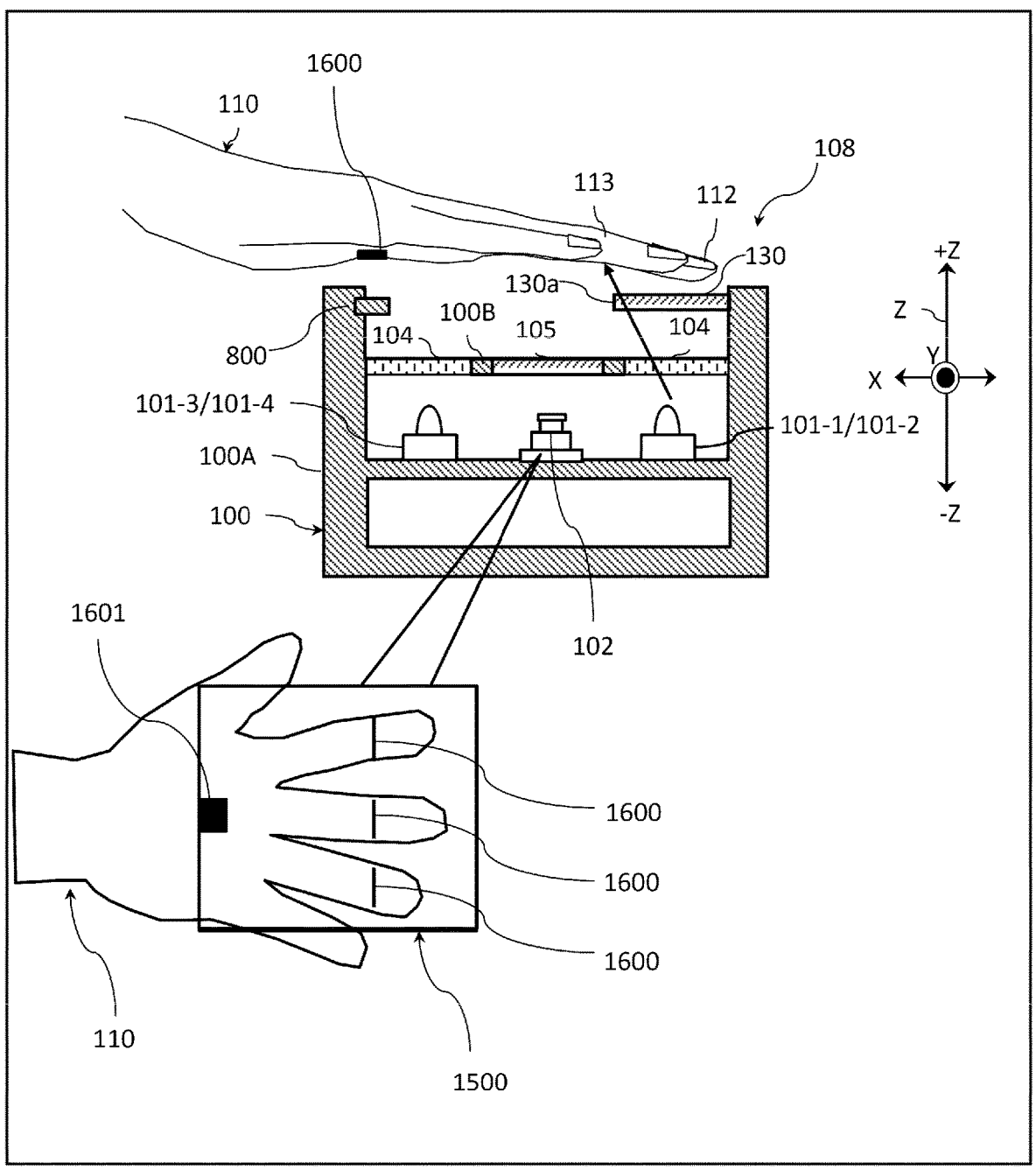
FIG. 10 is a diagram illustrating another configuration example of the imaging device according to the second embodiment.

FIG. 10 is a diagram illustrating another example of the shadow region. In the example in FIG. 10, the imaging device 108 further includes a protrusion structure 800 in addition to a configuration illustrated in FIG. 8. The protrusion structure 800 is provided in the housing 100A so as to generate a shadow region 1601 in the finger image data by the irradiation light from the light source 101. At this time, in order to prevent the reduction in the authentication accuracy, the protrusion structure 800 is preferably provided such that the shadow region 1600 is generated in a portion not used for authentication of the finger image data. In the example in FIG. 10, the protrusion structure 800 is provided on the base side of the finger.

In the example in FIG. 10, the processor 311 can detect at least one of the position and the posture of the finger based on the shadow region 1601 formed by the protrusion structure 800. For example, the processor 311 can detect whether the fingers 111 to 113 deviate from the appropriate position by determining whether the position of the shadow region 1601 in the finger image data deviates from the reference position by a predetermined distance or more. As a distance between the fingers 111 to 113 and the protrusion structure 800 becomes shorter, the position of the shadow region 1601 and the position of the protrusion structure 800 become closer in the finger image data 1500, and the boundary line of the shadow region becomes clearer. Therefore, the processor 311 may detect whether the finger deviates from the appropriate position based on the distance between the shadow region 1601 and the protrusion structure 800 in the finger image data 1500 and the clarity of the boundary line of the shadow region. The processor 311 may determine whether the fingers 111 to 113 deviate from the appropriate posture by determining whether the distortion of the shadow region 1601 deviates from an appropriate range.

A specific method of detecting at least one of the position and the posture of the finger based on the shadow region 1601 by the protrusion structure 800 is the same as the method of detecting at least one of the position and the posture of the finger based on the shadow region 1600 by the fingertip presenting plate 130.

<Example of Detecting Finger Region in Consideration of Shadow Region>

Figure 11:
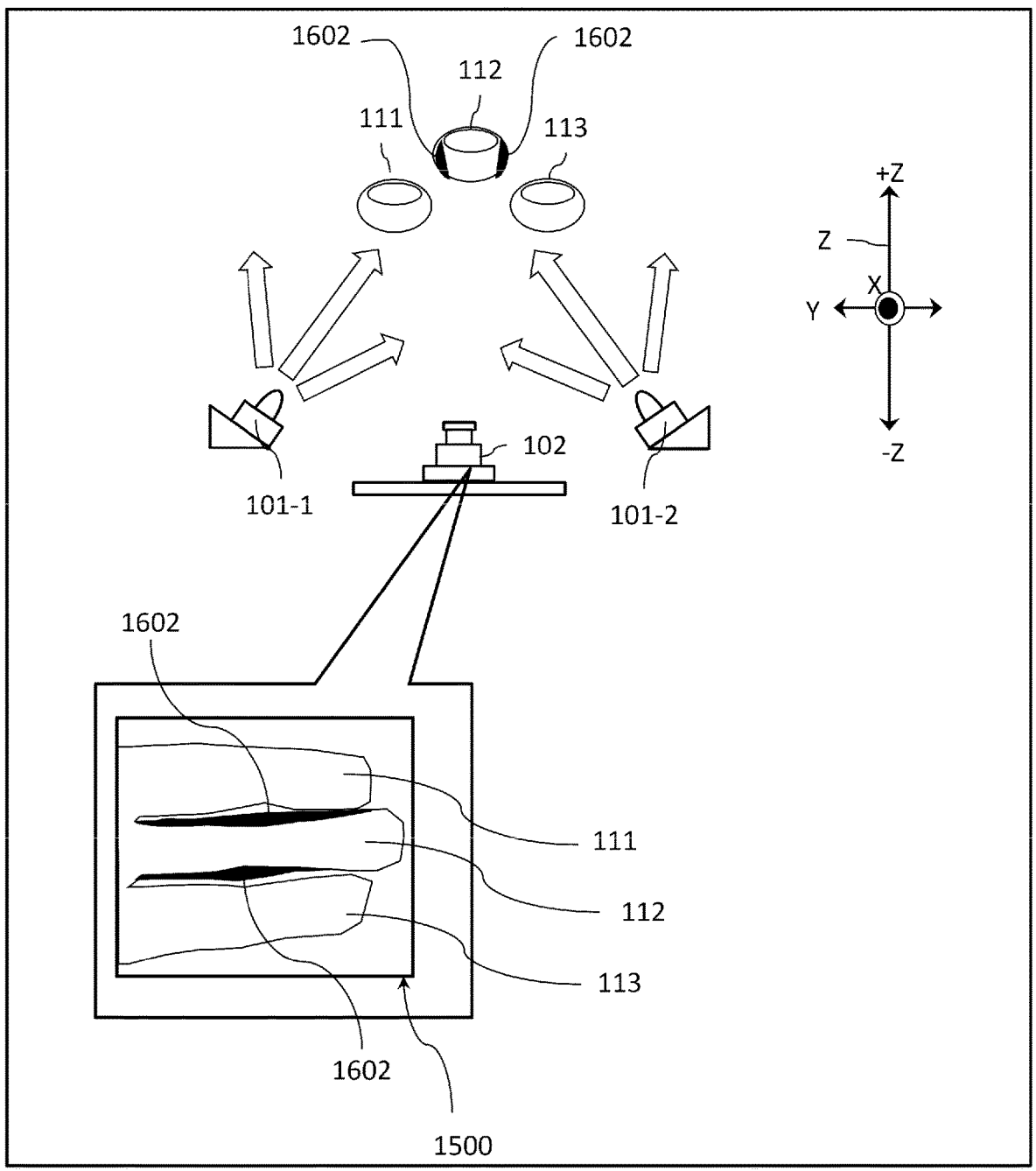
FIG. 11 is a diagram illustrating a finger detection method when the shadow region is generated according to the second embodiment.

FIG. 11 is a diagram illustrating an example in which the finger region is detected in consideration of the shadow region. As illustrated in FIG. 11, in a state where the plurality of fingers 111 to 113 are close to each other and the finger 112 is located at a position away from the finger 111 and the finger 113 is adjacent to the finger 112 in the +Z direction, the irradiation light to the finger 112 is blocked by the finger 111 and the finger 113, and thus a shadow region 1602 is generated in the finger image data 1500. In this case, it is difficult to specify the contour of the finger, and the detection accuracy of the finger may be reduced. Even in this case, the processor 311 can more accurately detect a finger by detecting, as the shadow region 1601, a region in which the luminance is lower than that of the surrounding region and the luminance of the visible light image data is lower than that of the near-infrared light image data, or by detecting, as the shadow region 1602, a region in which the luminance is lower than that of the surrounding region and the luminance change of the visible light image data is steeper than the luminance change of the near-infrared light image data.

The present embodiment can be carried out independently of the first embodiment.

As described above, according to the present embodiment, the processor 311 detects a shadow region indicating a shadow projected on the biometric object included in the biometric image data, and performs the shadow correspondence processing in accordance with the shadow region. Therefore, even when there is a shadow region, it is possible to prevent the reduction in the authentication accuracy.

In the present embodiment, the shadow correspondence processing is processing of removing the shadow region from the biometric region in which the biometric object included in the biometric object image data is copied. In this case, even when the shadow region is generated, it is possible to prevent the reduction in the authentication accuracy.

In the present embodiment, the shadow correspondence processing is processing of detecting at least one of the position and the posture of the biometric object based on the shadow region. In this case, when at least one of the position and the posture of the biometric object is not appropriate, it is possible to notify the person to be authenticated of the fact. Therefore, it is possible to perform the biometric authentication at the appropriate position and posture, and it is possible to prevent the reduction in the authentication accuracy.

In the present embodiment, since the protrusion structure 800 for projecting the shadow onto the biometric object is provided, it is possible to appropriately detect at least one of the position and the posture of the biometric object based on the shadow region.

In the present embodiment, since the shadow region is detected based on invisible light image data and the visible light image data separated from the biometric image data, it is possible to accurately detect the shadow region.

Third Embodiment

The third embodiment is a modification of the first embodiment, and is an example in which occurrence of a luminance saturation region in the finger image data is prevented in the first embodiment. Hereinafter, configurations and operations different from those of the first embodiment will be mainly described.

Figure 12:
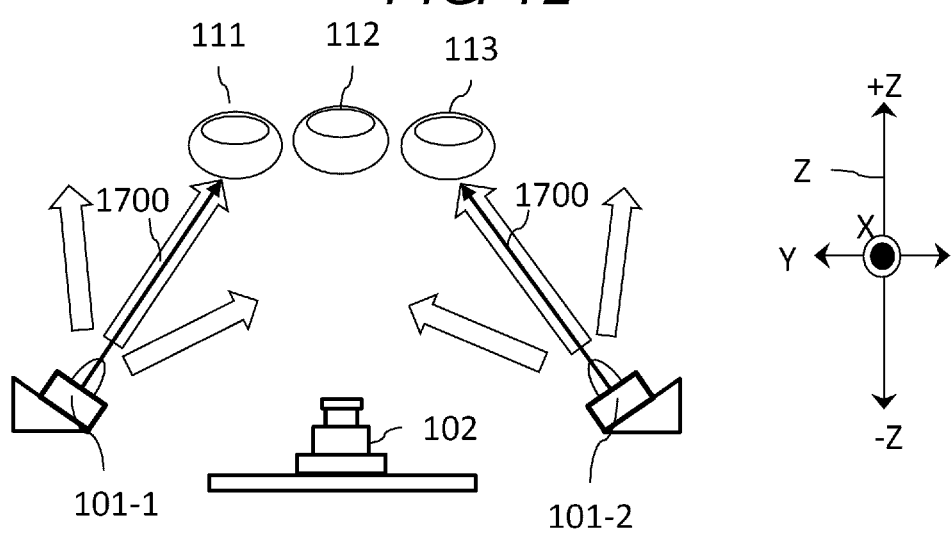
FIG. 12 is a diagram illustrating an example of luminance saturation.

FIG. 12 is a diagram illustrating the luminance saturation region. As illustrated in FIG. 12, a light amount emitted from the light source 101 is largest on an optical axis 1700.

Therefore, a pixel on finger image data corresponding to a biometric object portion irradiated with the irradiation light on the optical axis 1700 is likely to cause luminance saturation in which a luminance value reaches an upper limit. In the luminance saturation region which is a pixel region in which the luminance saturation occurs in the finger image data, information of the feature data is lost. Therefore, it may cause the reduction in the authentication accuracy. Therefore, it is desirable that the luminance saturation region is not generated in the finger image data.

Figure 13:
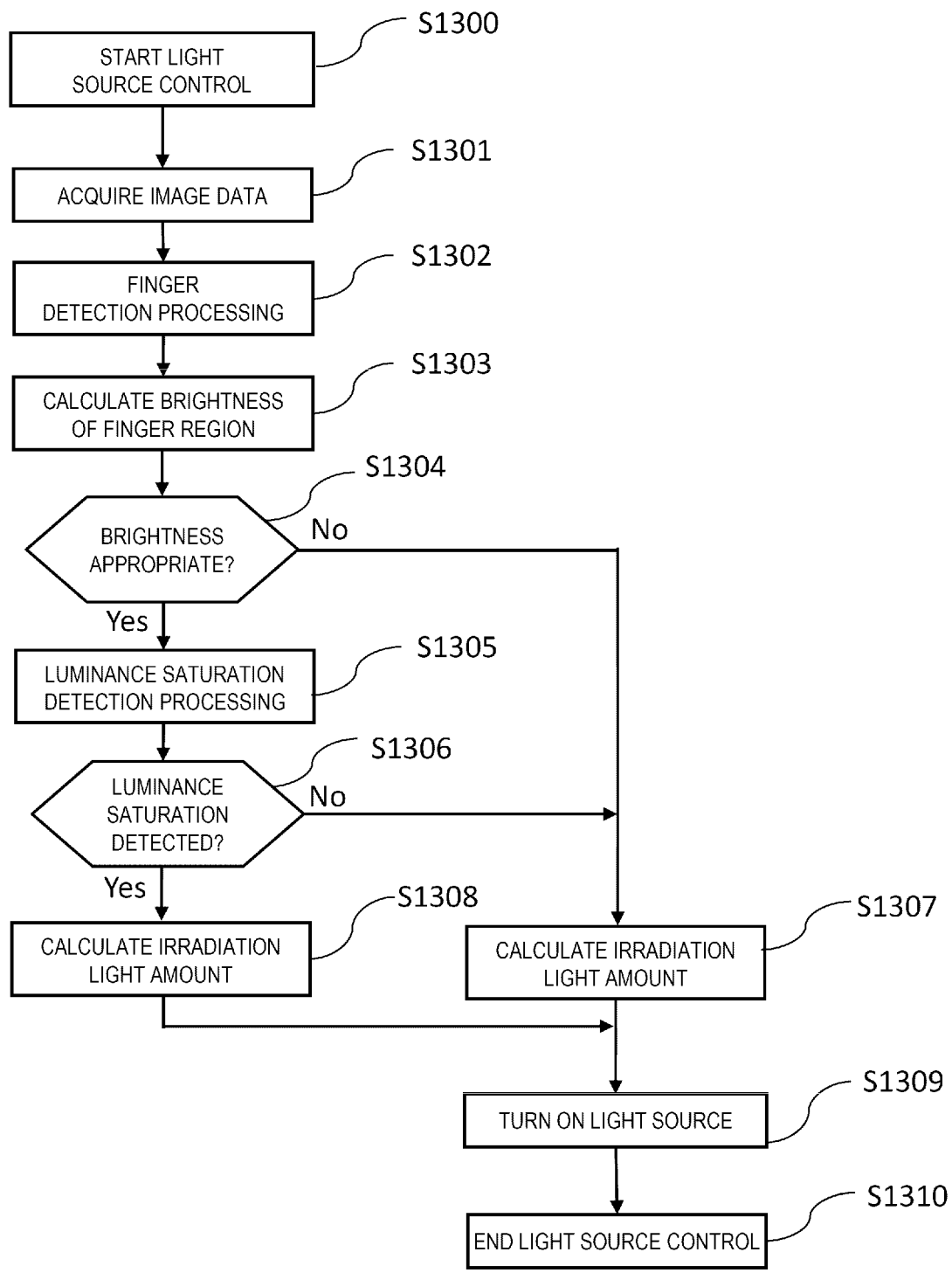
FIG. 13 is a flowchart illustrating luminance saturation reduction processing of an imaging device according to a third embodiment.

FIG. 13 is a flowchart illustrating an example of light source control processing for preventing the occurrence of the luminance saturation region. The light source control processing is performed, for example, between steps S405 and S406 in FIG. 4.

First, at a start timing of the light source control processing, the processor 311 controls the light source control unit 300 to cause the light source 101 to emit light in the second irradiation mode (step S1300). The processor 311 is driven by the imaging unit 102. The imaging unit 102 performs the imaging to generate image data and stores the image data in the data memory 106 as the finger image data (step S1301).

The processor 311 analyzes the image data stored in the data memory 106, and executes finger detection processing for detecting a finger region in which the fingers 111 to 113 are copied in the image data (step S1302). Then, the processor 311 calculates the brightness of the finger region (step S1303). The brightness of the finger region is, for example, an average luminance value which is an average of luminance values of pixels included in the finger region.

The processor 311 determines whether the brightness of the finger region is included in the predetermined appropriate range (step S1304).

When the brightness of the finger region is included in the appropriate range (step S1304: Yes), the processor 311 performs luminance saturation detection processing for detecting the luminance saturation region based on luminance information of the finger region (step S1305). Then, the processor 311 determines whether the luminance saturation region is detected based on a processing result of region detection processing (step S1306). The luminance saturation detection processing is, for example, processing of counting the number of pixels whose luminance value is an upper limit value. For example, when the number of pixels whose luminance value is the upper limit value is equal to or greater than a predetermined value, the processor 311 determines that the luminance saturation region is detected.

When the brightness of the finger region is not included in the appropriate range (step S1304: No), and when the luminance saturation region is not detected (step S1306: No), the processor 311 calculates, as an irradiation light amount in the second irradiation mode, an appropriate light amount which is the light amount of the irradiation light from the light source 101 such that the brightness of the finger region becomes appropriate based on the brightness of the finger region (step S1307). For example, an appropriate value of the brightness of the finger region is registered in advance in the data memory 106 or the storage device 312, and the processor 311 calculates an appropriate light amount based on a difference between the brightness of the finger region and the appropriate value and the light amount of the irradiated irradiation light in step S1300. In this case, even when presentation positions of the fingers 111 to 113 (heights of the fingers 111 to 113) in the Z direction vary, it is possible to irradiate the fingers 111 to 113 with light of uniform intensity.

When the luminance saturation region is detected (step S1306: Yes), the processor 311 calculates the appropriate light amount based on the brightness of the finger region, and further calculates, as the irradiation light amount, a light amount obtained by subtracting a predetermined light amount from the appropriate light amount so as to prevent the luminance saturation region (step S1307).

In the present embodiment, the predetermined light amount is subtracted from the appropriate light amount such that the luminance saturation region is prevented when the brightness of the finger region is included in the appropriate range. That is, since the brightness of the entire finger region is an appropriate brightness, it is desirable to set the predetermined light amount to a small value. The predetermined light amount may be determined in advance, or may be determined based on a size of the luminance saturation region, a ratio of the luminance saturation region to the finger region, or the like. The same predetermined light amount may be used for the plurality of light sources 101, or the predetermined light amount may be subtracted from the appropriate light amount only for the light source 101 disposed at a position closest to the finger or site where the luminance saturation region occurs. As described above, the near-infrared light is internally scattered from the surface of the biometric object at a shallow portion inside the biometric object and is diffusely reflected to the outside of the biometric object, and the visible light is easily reflected on the surface of the biometric object. Therefore, the luminance saturation is more likely to occur in the visible light than in the near-infrared light. Therefore, the predetermined light amount may be subtracted from the appropriate light amount only for the light source 101 that emits the visible light.

Then, the processor 311 turns on the light source 101 with the irradiation light amount determined in step S1307 or S1308 (step S1309), and ends the light source control processing (step S1310).

After the processing in step S1307, the same processing as the processing in step S1306 may be performed. When the luminance saturation region is detected in the processing, the processing in step S1308 is executed. When the luminance saturation region is not detected, the processing in step S1309 is executed.

As described above, according to the present embodiment, the processor 311 reduces the light amount of the irradiation light in the second irradiation mode when the luminance saturation region is present in the biometric image data. Therefore, since it is possible to prevent an alkyd saturation region, it is possible to prevent the reduction in the authentication accuracy.

Fourth Embodiment

The fourth embodiment is a modification of the first embodiment, and is an example in which finger detection accuracy is improved by using a difference between a light amount of light emitted from the light source 101 and a light amount of environmental light in the finger detection processing (step S404). Hereinafter, configurations and operations different from those of the first embodiment will be mainly described.

In the first embodiment, the finger is detected using the near-infrared light image data. In this case, there is no particular problem when the light amount of the near-infrared light included in the environmental light is sufficiently smaller than the light amount of the near-infrared light included in the irradiation light from the light source 101, which is assumed in the first embodiment. However, when the light amount of the near-infrared light included in the environmental light is large, the near-infrared light becomes strong in both the finger region and the background region. Therefore, it is difficult to distinguish the finger region from the background region, and there is a concern that the finger region cannot be appropriately determined.

In the present embodiment, in the first irradiation mode, the processor 311 causes the light source 101 to emit the near-infrared light and causes the light source 101 to emit the visible light with a light amount smaller than the light amount of the near-infrared light. The processor 311 separates the image data acquired in the first irradiation mode into the visible light image data and the near-infrared light image data, and determines whether a biometric object is presented based on the visible light image data and the near-infrared light image data.

For example, the processor 311 separates the image data stored in the data memory 106 into the near-infrared light image data and the visible light image data. In the visible light image data, when the light amount of the visible light included in the environmental light is larger than the light amount of the visible light emitted by the light source 101, the vicinity of the boundary line between the finger region and the background region is brighter (the luminance is higher) than the inside of the finger region, and when the light amount of the visible light included in the environmental light is smaller than the light amount of the visible light emitted by the light source 101, the entire finger region is relatively brighter (the luminance is higher) than the background region.

In this case, in the visible light image data, the processor 311 specifies, as a finger candidate region, a region having a high luminance in the vicinity of the boundary line between the foreground region and the background region or a region having a high luminance in the foreground region. Then, the processor 311 specifies, for example, a region in which the finger candidate region in the visible light image data and the foreground region in the near-infrared light region overlap with each other as the finger region.

As described above, in the present embodiment, the processor 311 separates the image data into the visible light image data and the near-infrared light image data, and determines whether the biometric object is presented based on the visible light image data and the near-infrared light image data. Therefore, it is possible to more appropriately determine whether the biometric object is presented.

The embodiments of the disclosure described above are examples for the purpose of explaining the disclosure, and the scope of the disclosure is not intended to be limited only to those embodiments. A person skilled in the art could have implemented the disclosure in various other embodiments without departing from the scope of the disclosure.

What is claimed is:

1. An imaging device comprising:
an irradiator configured to emit visible light and invisible light as irradiation light;
an imager configured to capture an image of an irradiation region irradiated with the irradiation light to acquire an image; and
a controller configured to:
cause the imager to acquire a detection image as the image in a first mode in which the irradiator emits the invisible light,
determine whether a biometric object is presented in the irradiation region based on the detection image,
when the biometric object is presented, cause the imager to acquire a biometric image obtained by copying the biometric object as the image in a second mode in which the irradiator emits the visible light and the invisible light,
detect a shadow region indicating a shadow projected on the biometric object included in the biometric image,
perform shadow correspondence processing according to the shadow region,
separate the biometric image into (1) the visible light image based on the visible light, and (2) the invisible light image based on the invisible light, and
detect the shadow region based on the visible light image and the invisible light image.

2. An imaging device comprising:
an irradiator configured to emit visible light and invisible light as irradiation light;
an imager configured to capture an image of an irradiation region irradiated with the irradiation light to acquire an image; and
a controller configured to:
cause the imager to acquire a detection image as the image in a first mode in which the irradiator emits the invisible light,
determine whether a biometric object is presented in the irradiation region based on the detection image,
when the biometric object is presented, cause the imager to acquire a biometric image obtained by copying the biometric object as the image in a second mode in which the irradiator emits the visible light and the invisible light,
in the first mode, further emit the visible light with a light amount smaller than a light amount of the invisible light from the irradiator.

3. The imaging device according to claim 2, wherein the controller is further configured to separate the detection image into a visible light image by the visible light and an invisible light image by the invisible light, and determine whether the biometric object is presented in the irradiation region based on the visible light image and the invisible light image.

4. The imaging device according to claim 1, wherein the controller is configured to perform, as the shadow correspondence processing, processing of removing the shadow region from a biometric region in which the biometric object included in the biometric image is copied.

5. The imaging device according to claim 1, wherein the controller is configured to perform, as the shadow correspondence processing, processing of detecting at least one of a position and a posture of the biometric object based on the shadow region.

6. The imaging device according to claim 5, further comprising:
a protrusion structure configured to project a shadow onto the biometric object presented in the irradiation region.

7. The imaging device according to claim 1, wherein the controller is configured to:
determine whether a luminance saturation region is present in the biometric image, and
when the luminance saturation region is present, decrease a light amount of the irradiation light in the second mode.

8. An authentication device comprising:
the imaging device according to claim 1; and
wherein the controller is configured to perform biometric authentication based on a biometric image.

9. A biometric imaging method using an imaging device including an irradiator configured to emit visible light and invisible light as irradiation light, and an imager configured to capture an image of an irradiation region irradiated with the irradiation light, the biometric imaging method comprising:

causing the imager to acquire a detection image as the image in a first mode in which the irradiator emits the invisible light, determining whether a biometric object is presented in the irradiation region based on the detection image, when the biometric object is presented, causing the imager to acquire a biometric image obtained by copying the biometric object as the image in a second mode in which the irradiator emits the visible light and the invisible light, and in the first mode, further emitting the visible light with a light amount smaller than a light amount of the invisible light from the irradiator.

\* \* \* \* \*